United States Patent
David et al.

(10) Patent No.: US 7,395,161 B2
(45) Date of Patent: Jul. 1, 2008

(54) POLYMODAL BIOLOGICAL DETECTION SYSTEM

(76) Inventors: Thomas A. David, 1762 Ensenada Tres, Pensacola Beach, FL (US) 32561; Patricia L. Roberts, 1762 Ensenada Tres, Pensacola Beach, FL (US) 32561

( * ) Notice: Subject to any disclaimer, the term of this patent is extended or adjusted under 35 U.S.C. 154(b) by 0 days.

(21) Appl. No.: 11/351,985

(22) Filed: Feb. 10, 2006

(65) Prior Publication Data

US 2007/0192032 A1 Aug. 16, 2007

(51) Int. Cl.
*G06F 7/04* (2006.01)

(52) U.S. Cl. ............................. 702/19; 702/81; 702/182; 702/183

(58) Field of Classification Search .................. 702/75, 702/99, 125, 182, 188, 189, 19, 81, 183; 43/131; 340/573.2; 700/283; 706/45
See application file for complete search history.

(56) References Cited

U.S. PATENT DOCUMENTS

| | | | | |
|---|---|---|---|---|
| 5,592,774 A | 1/1997 | Galyon | ........................ | 43/124 |
| 5,890,085 A | 3/1999 | Corrado et al. | ................ | 701/47 |
| 6,052,066 A | 4/2000 | Su | ........................ | 340/870.16 |
| 6,085,576 A | 7/2000 | Sunshine et al. | ............ | 73/29.01 |
| 6,234,006 B1 | 5/2001 | Sunshine et al. | ............ | 73/29.01 |
| 6,266,918 B1 * | 7/2001 | Henderson et al. | ............. | 43/131 |
| 6,314,380 B1 * | 11/2001 | Seip et al. | ...................... | 702/99 |
| 6,422,061 B1 | 7/2002 | Sunshine et al. | ............ | 73/29.01 |
| 6,768,982 B1 * | 7/2004 | Collins et al. | .................. | 706/45 |
| 6,792,395 B2 * | 9/2004 | Roberts | ...................... | 702/188 |
| 6,801,131 B2 | 10/2004 | Donskoy et al. | .......... | 340/573.1 |
| 6,862,917 B2 | 3/2005 | Apostolos et al. | ........... | 73/24.06 |
| 6,895,338 B2 | 5/2005 | Hsiung et al. | .................. | 702/22 |
| 6,972,677 B2 | 12/2005 | Coulthard | .................... | 340/531 |
| 7,057,516 B2 * | 6/2006 | Donskoy et al. | .......... | 340/573.1 |
| 7,233,251 B2 | 6/2007 | Lewis | ...................... | 340/573.2 |
| 2003/0028536 A1 | 2/2003 | Singh et al. | .................... | 707/10 |
| 2003/0213161 A1 | 11/2003 | Gardner, Jr. et al. | ........... | 43/61 |

FOREIGN PATENT DOCUMENTS

| | | | |
|---|---|---|---|
| WO | WO 2004/010398 A1 | 7/2003 | |
| WO | WO 2004/072918 A2 | 8/2004 | |

* cited by examiner

*Primary Examiner*—Eliseo Ramos-Feliciano
*Assistant Examiner*—Felix Suarez
(74) *Attorney, Agent, or Firm*—Renner Kenner Greive Bobak Taylor & Weber

(57) ABSTRACT

The present invention relates to a method and system for providing biological detection. The system includes: at least one polymodal sensor for collectively detecting at least two conditions; and at least one node, each node including at least one of the polymodal sensors. The system also includes at least one data collector; each data collector communicating with one or more of the at least one node, and each data collector storing local information in a local knowledge base; and at least one server, each server communicating with one or more of the at least one data collector, and each server updating a global knowledge base. The at least two conditions are utilized in detecting the presence of biological activity from either one or both knowledge bases.

15 Claims, 1 Drawing Sheet

POLYMODAL BIOLOGICAL DETECTION SYSTEM

FIELD OF INVENTION

The present invention is related to a distributed network of sensors that detect one or more conditions. More particularly, the present invention relates to polymodal sensors that are used to detect and report the presence of biological activity.

BACKGROUND

Pest detection, management, and control is a multi-billion dollar industry. Generally, property owners want to use the most economical means to minimize the number of pests on the property. To this end, conventional pest detection systems typically involve two separate steps: detection and treatment. Conventional detection involves a technician physically inspecting premises for pests. In order to determine if pests are present, the technician must regularly and thoroughly examine the premises. In fact, the greatest expense for most pest control businesses is the labor associated with these regular customer inspections. Approximately 75 percent of the technician's time is spent performing on-site inspections. If a technician finds pests, then the property owner may elect to enter the treatment phase. Treatment is usually fairly simple and often consists of applying pesticide to the premises. However, after a period of time, application of pesticide is applied regardless of whether any pests are present or not. And it is also known to arbitrarily pre-treat building sites with chemicals before building. In such instances, application of the pesticide is wasteful and may needlessly contribute to groundwater pollution.

In order to reduce the labor associated with these regular customer inspections, recent advances in pest detection systems have seen a variety of sensors and systems that attempt to automatically detect the presence of pests. For example, one known system uses a vibration sensor to detect the presence of termites in a home. When termites move near the vibration sensor, the sensor detects the vibration and the system indicates that termites are present. However, this type of system is problematic because it may be triggered by events other than termites—for example, a person walking nearby or construction occurring in the vicinity may trigger the vibration sensor. Other known systems also suffer from an inability to accurately determine whether a particular pest is present and false readings commonly occur. And these sensors provide no adaptability for the geographical region in which they are located. For example, detection of pests in a tropical environment may be much different in a desert environment. Thus, current systems are unable to detect pest activity with sufficient reliability to be economically feasible.

Thus, a system and method is needed that accurately determines whether pests are present and allows property owners and/or pest management businesses to minimize the number of pests on the premises by the most economical means.

SUMMARY OF THE INVENTION

In light of the foregoing, it is a first aspect of the present invention to provide a polymodal biological detection system.

Another object of the present invention is to provide a method of detecting biological activity, comprising: positioning one or more polymodal sensors that detect data relating to at least two conditions in at least one zone; accumulating the data in at least one data collector to generate a local knowledge base; gathering information from the at least one data collector in at least one server; and processing the information to generate a global knowledge base that is representative of at least one biological activity in at least one zone.

Another aspect of the present invention is to provide a detection system, comprising at least one polymodal sensor monitoring at least two conditions; at least one node including the at least one polymodal sensor; at least one data collector in communication with at least one node, each data collector maintaining a local knowledge base of collected sensor data from the at least one node; at least one server, each server in communication with one or more of the at least one data collector, and each server updating a global knowledge base of collected sensor data from the at least one data collector; and wherein the at least two conditions are utilized in detecting the presence of biological activity from sensor data contained in the global knowledge base.

Yet another goal of the present invention is to provide a detection system, comprising: at least one node, each node including at least two sensors for detecting at least one condition and each node generating a node signal related to at least one condition; at least one data collector, each data collector receiving at least one node signal from at least one node and storing local information in a local knowledge base and each data collector generating a data collector signal related to the information in the local knowledge base; and at least one server, each server receiving the data collector signal from at least one data collector and updating a global knowledge base; and wherein the at least one server analyzes at least two conditions maintained in the global knowledge base to determine the presence of biological activity

BRIEF DESCRIPTION OF THE DRAWING

For a complete understanding of the objects, techniques and structure of the invention, reference should be made to the following detailed description and accompanying drawing.

BEST MODE FOR CARRYING OUT THE INVENTION

Figure 1:
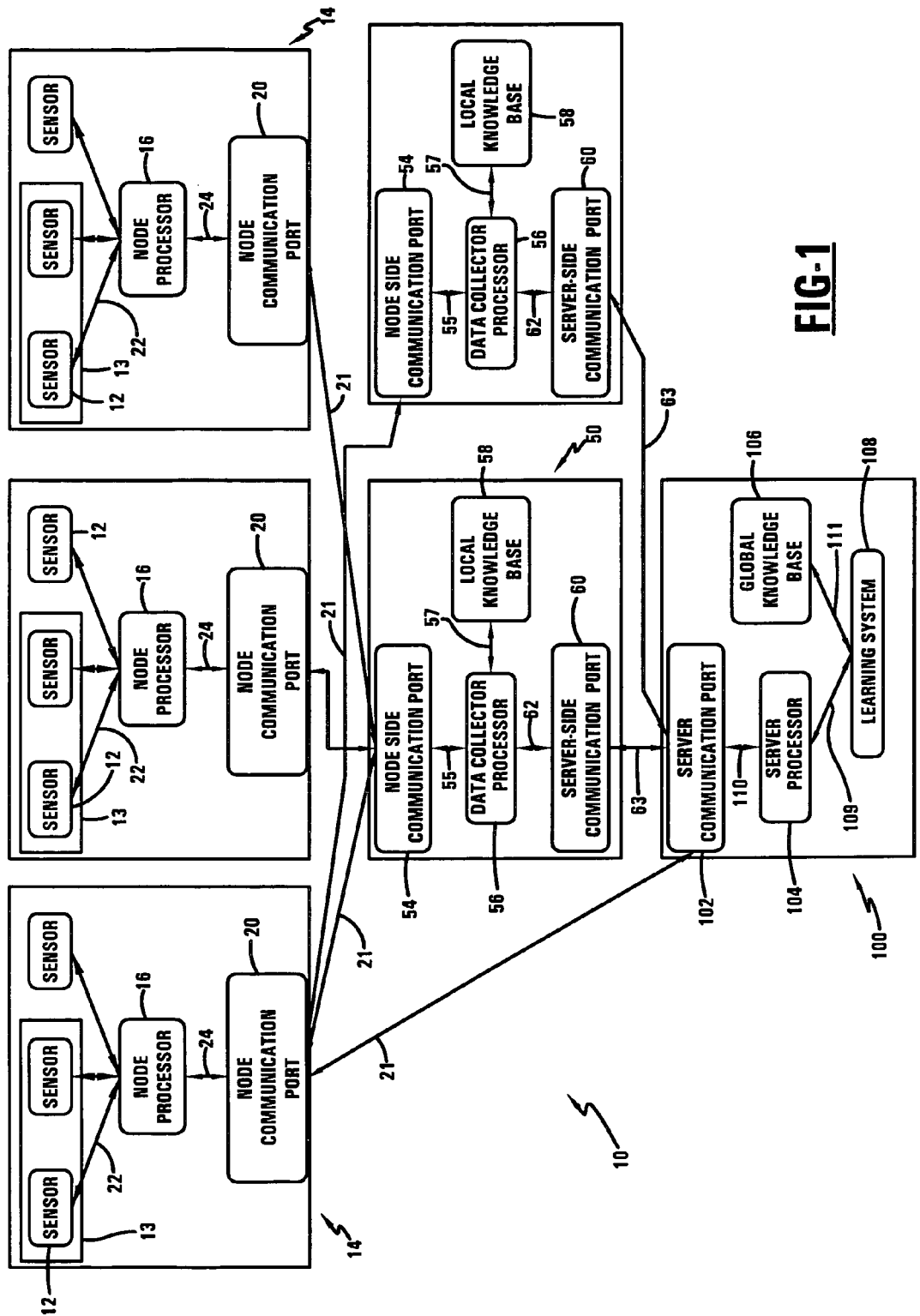
FIG. 1 shows a schematic view of the polymodal biological system according to the present invention.

The present concept relates to a biological detection system that detects biological activity including, but is not limited to: insect activity, rodent activity, reptilian activity, bird activity, other animal activity, fungal activity, mold growth, spore dissemination, or any other type of detectable biological activity.

Referring now to the drawing, it can be seen that a polymodal biological detection system is generally designated by the numeral 10. The polymodal biological detection system 10 may include: sensors 12 for individually or collectively detecting at least two conditions, wherein two or more associated sensors define the polymodal nature of the sensor 13; one or more nodes 14, each node 14 communicating information to one or more data collectors 50; and each data collector 50 communicating data to one or more servers 100. By correlating condition information from at least two conditions, the detection system 10 can accurately determine whether predetermined biological activity is present.

One or more polymodal sensors 13 are grouped in particular zones to measure the biological activity in those respective zones. For example, a zone may be defined by the enclosed area of a home, business, or other inhabitable or uninhabitable structure; a perimeter of a property, a region beneath the surface of a property, or a region above a property; a region of a park; a portion of one or more trees; an area of marshland, swampland, or open water; or any other zone in which a user might want to monitor biological activity.

In general, each sensor 12 may be any device that generates an electrical or optical signal that corresponds to a characteristic associated with biological activity. Each sensor 12 may detect at least one condition. For example, a sensor 12 may detect any one or a combination of weight, length, width, height, volume, scent, noise, vibration, speed, chemistry, temperature, moisture, density, any other environmental condition, any other measurable physical characteristic, or any other condition for detecting the presence of a particular biology or pest. The sensor 12 may be a transducer, camera or other optical sensor, a series of embedded wires in an edible bait block, a pressure sensing plate, a capacitive element, or any other type of detecting or sensing device. In other words, the sensor enables a methodology to determine the presence or quality of any one of the foregoing characteristics. It is envisioned that each sensor 12 may be configured to observe a characteristic trait of a pest known to frequent a particular zone. For example, a growing colony of termites is expected to generate an expected range of detectable audible frequencies. Accordingly, the sensor can be configured to detect audible noise at the expected range and at an expected amplitude. Or some pests are known to emit a detectable smell or odor detectable by the sensor.

Generally, at least one node 14 incorporates at least one polymodal sensor 13 to detect a biological activity condition. Each node 14 may include: one polymodal sensor 13 for detecting one or more biological activity conditions, one or more node processors 16 for processing information from the one or more polymodal sensors 13, and a node communication port 20 for transmitting a node signal 21. Each node 14 may transmit information to one or more data collectors 50, or transmit data to one or more servers 100, or if desired, transmit to combinations of data collectors 50 and servers 100.

Each node 14 will include at least two sensors 12, wherein each sensor 12 may detect a different condition. For example, in a particular embodiment, a node 14 may include a polymodal sensor 13 that includes a vibration sensor and a chemical sensor. This combination of a vibration sensor and a chemical sensor could be properly deemed a polymodal sensor because it detects more than one condition. Although the term "polymodal sensor" includes a combination of sensors disposed in a single node 14, the term is not limited to such arrangements. For example, the term "polymodal sensor" may also include a combination of sensors disposed across different nodes, each node having at least two sensors for detecting one or more conditions. Moreover, each node 14 may 30 include any number of sensors 12. For example, a node 14 may have two sensors, or any other number of sensors that can be supported by the node processor 16.

Each polymodal sensor 13 transmits a sensor signal 22 to the node processor 16. The sensor signal 22 is an electrical, optical or wireless signal that corresponds to a condition detected by each sensor 12. Typically, the sensor signal 22 is transmitted across a conductive material, such as copper wire, galvanized wire, optical fibre or the like. The node processor 16 may receive one or more sensor signals 22 from a corresponding sensor 12. Typically, each node processor 16 receives one or more sensor signals 22 that originate from one or more sensors 12 located in same node 14 as the node processor 16. As used in this specification, the term "processor" encompasses a microcontroller, a microprocessor, a digital signal processor (DSP), an application-specific integrated circuit (ASIC), a field programmable gate array (FPGA), a programmable logic array (PLA), or any other digital processing engine or device. The node processor 16 contains the necessary hardware, software and memory for enabling the system 10. The node processor 16 is capable of adjusting, setting and communicating to the sensors 12 or the polymodal sensors 13 the parameters and ranges of parameters that are to be observed. For example, the processor may initially set an auditory sensor to monitor a certain range of frequencies of a predetermined amplitude for a particular kind of pest. The node processor 16 may be instructed by the server 100 to change these parameters based upon: the season of the year; environmental factors, such as for example humidity and/or temperature, or for the type of biologic activity being observed. And the processor 16 may undertake performance tests of each sensor to ensure that they are functioning properly and relays this performance information to the respective data collector 50. In the alternative, the server 100 may implement the aforementioned changes and tests.

In any event, the node processor 16 transmits a processed signal 24 between the node communication port 20. Typically, the processed signal 24 is an electrical signal that travels across a bus, wire, or other conductive material. The node communication port 20 may also be referred to as a transmitter/receiver port. Each node communication port 20 works in tandem with each node processor 16 to transmit the node signal 21 to one or more data collectors 50 or one or more servers 100, or combinations thereof. In various embodiments, each node communication port 20 may directly transmit the node signal 21 to only one data collector 50 or only one server 100. In other embodiments, each node communication port 20 may directly or indirectly communicate with multiple data collectors 50 or multiple servers 100. Although the node signal 21 may often represent digital data, the node signal 21 may be an analog signal and may contain information related to the conditions sensed by the polymodal sensors 13. The node signal 21 may be transmitted wirelessly or via a hardwired medium. And as noted previously, information may be transmitted from the server(s) 100 and/or the data collector(s) 50 to the nodes 14 and, if appropriate, the sensors 12 or the polymodal sensors 13.

If transmitted wirelessly, the node signal 21 may be transmitted via radio, infrared, visible light, microwave, or any other portion or portions of the electromagnetic spectrum. If transmitted wirelessly, a wireless protocol such as 802.11, Bluetooth, WEP, WAP, TDMA, CDMA, a proprietary protocol, or any other wireless protocol may be utilized to transmit the node signal 21 or other data from the node 14 to one or more data collectors 50. The node signal 21 may also be transmitted via a hardwire medium such as copper wire, optical fiber, or any other hardwire medium. If transmitted in this fashion, the node signal 21 or other data may be transmitted to one or more data collectors 50 via various protocols including: TCP/IP, ATM, USB, FireWire, a proprietary protocol, or any other number of hardwired protocols. Whether transmitted via a wireless or a hardwire medium, the data may be sent in packets or it may be otherwise structured.

Generally, at least one data collector 50 may receive information from one or more nodes 14, may process the information, and communicate data to one or more servers 100. Each data collector 50 may include: a node-side communication port 54 that receives one or more node signals 21, the node signal including node information; one or more data collector processors 56 for analyzing the node information; one or more memories for storing a local knowledge base 58; and a server-side communication port 60 for transmitting a data collector signal 62 to the server 100. In various embodiments, the data collector 50 may be located at least in part in a terrestrial server or other terrestrial computing system. In other embodiments, the data collector 50 may be located at least in part in a satellite or other non-terrestrial computing system.

Typically, the data collector 50 receives one or more node signals 21, each node signal 21 corresponding to a node 14. The data collector 50 may receive node signals 21 from any number of nodes 14. For example, various embodiments of the data collector 50 may receive node signals 21 from any number of nodes.

The node-side communication port 54 may also be referred to as a receiver/transmitter block. If present, the node-side communication port 54 may work in tandem with the data collector processor 56 to receive node signals 21 from one or more nodes 14. The node-side communication port 54 may convert the node signal 21 into a format signal 55. Typically, the format signal 55 is an electrical signal that travels across a bus, wire, or other conductive material, or the signal could be wireless.

The data collector processor(s) 56 receives the format signal 55 and transfers some or all of the data from the sensors to the connected local knowledge base via a data link 57, wherein the local knowledge base 58 may store some operational sensor data in a usable format for later analysis. The data collector processor 56 may store data in one or more memories that may be located in the data collector 50. The one or more memories may include one or a combination of RAM, SRAM, DRAM, SDRAM, flash memory, optical memory, magnetic disks, CDs, DVDs, or any other type of memory. In any event, these memory(ies) may store the local knowledge base 58. The local knowledge base may comprise an aggregation of the raw node information (e.g. a table of information), a compilation of analyzed data (e.g. no raw data), or a combination of raw data and processed data. For example, this data might be environmental in nature such as altimeter or barometer readings. Or the data may include low-level information such as recent historical settings on any one of the associated sensors. In any event, the data collector processor 56 may transmit a data collector signal 62 to the data collector's server-side communication port 60, wherein the port 60 further modifies the signal 62, which contains the original information and modifications introduced by the processor 56 and/or the local knowledge base 58, and converts it into a port transfer signal 63. The server-side communication port 60 may also be referred to as a transmitter and receiver port.

The server-side communication port 60 may work in tandem with the data collector processor 56 to transmit the port transfer signal 63 to one or more servers 100. In various embodiments, each server-side communication port 60 may directly transmit the port transfer signal 63 to only one server 100. In other embodiments, each server-side communication port 60 may directly or indirectly communicate with multiple servers 100 via one or more port transfer signals 63. Although it may represent digital data, port transfer signal 63 is generally an analog signal. The port transfer signal 63 may be received wirelessly or via one or more wires.

Generally, at least one server 100 may receive data from one or more data collectors 50 or information from one or more nodes 14, or combinations thereof. Each server 100 may process the information, and communicate data to one or more servers 100 or, if required, back to the data collectors and/or the nodes. The server(s) 100 may include a server communication port 102, at least one server processor 104, and one or more server memories that store a global knowledge base 106. The server 100 may also include a learning system 108 that utilizes expert systems and/or artificial intelligence. If an expert system is employed, information received from the data collector, and in particular the local knowledge base may be processed. For example, the learning system 108 may utilize an expert system software program to vanguard processing of data collected by the nodes 14 whereby it will validate or discount detections by the sensors 12. In other embodiments, the learning system 108 may also employ an artificial intelligence program in cooperation with the expert system to continuously adjust threshold parameters of the expert system as allowed within the confines of possibilities known by the historical data retained and continuously updated in the global knowledge base 106 in order to improve accuracy of detections. The learning system 108 will then manipulate or filter the results of said adjustments and store them in the global knowledge base 106 as further basis for improvement in accuracy of such detections and to support its predictive capability. To accomplish the aforementioned processing, adjustment, filtering and so on, the learning system 108 utilizes data links 109 and 111 which are connected to the server processor 104 and 106, respectively.

Typically, the server 100 receives one or more port transfer signals 63, each of which corresponds to a data collector 50. Alternatively, the server may also receive one or more node signals 21. The server 100 may receive port transfer signals 63 from any number of data collectors 50. For example, various embodiments of the server 100 may receive port transfer signals 63 from one data collector, or any other number of data collectors.

The server communication port 102 may also be referred to as a receiver and transmitter port. If present, the server communication port 102 may work in tandem with the server processor 104 to receive port transfer signals 63 from one or more data collectors 50. The server communication block transforms the port transfer signal 63 into a server signal 110. And as noted, the port may transmit a transfer signal 63 back to the appropriate port 20 and/or 60. In any event, the server processor 104 receives the server signal 110 and processes the information therein. The server processor 104 may store data in one or more memories that may be located in the server 100. The one or more memories may include one or a combination of RAM, SRAM, DRAM, SDRAM, flash memory, optical memory, magnetic disks, CDs, DVDs, or any other type of memory. In any event, these memory(ies) may store the global knowledge base 106. The server may include more than one server processor 104. A portion of the software that runs at least in part on the one or more server processors, may be referred to as a learning system 108. In other words, the learning system 108 is enabled by the server processor 104 and the global knowledge base 106 to detect and report biological activity as described herein.

In operation, the polymodal biological detection system 10 detects at least two conditions via one or more polymodal sensors that may be disposed about various nodes 14. Various embodiments of the system then utilize these at least two conditions to make an accurate determination whether, in fact, the sensors 12 are determining the presence of the predetermined biological activity.

In detecting biological activity, a user may position one or more polymodal sensors in at least one zone. A zone may be defined, for example, by the enclosed area of a home, business, or other inhabitable or uninhabitable structure; a perimeter of a property, a region beneath the surface of a property, or a region above a property; a region of a park; a portion of one or more trees; an area of marshland, swampland, or open water; or any other point, area, region, or volume in which a user might want to monitor biological activity. After the one or more polymodal sensors have detected at least two conditions, one or more node processors 16 may process the data from the sensors. The node processor 16 may also generate service interrupts, reset various registers of the sensors, take care of other system requirements in the node 14, or perform numerous other tasks.

In one embodiment, the node processor 16 collects and transmits the data between the two detected conditions in order for the data to be further processed for the determination of whether a particular biological activity is present. For example, a node 14 might include a vibration sensor to detect the presence of termites in a home. When termites move near the vibration sensor, the sensor detects the vibration and the system indicates that termites are present. However, because a vibration sensor alone might be triggered inadvertently, a node might also include a chemical sensor. By transmitting the information from the vibration sensor and the chemical sensor, the data collector 50 may be able to more accurately determine whether a predetermined biological activity is present. As mentioned previously, the polymodal detection system 10 may employ any combination of various sensors and is not limited to a combination of chemical and vibration sensors.

In various embodiments, each data collector 50 may include at least one data collector processor 56. This data collector processor 56 correlates at least two conditions in the at least one zone to aid in determining whether one or more nodes 14 are detecting the targeted biological activity in the zone. The data processor 56 processes information relating to at least two conditions originating from a single node 14 or originating from multiple nodes. In considering the at least two conditions, the data collector processor 56 may also consider information stored in the local knowledge base 58. In other embodiments, the data processor may analyze only the local knowledge base 58.

In still other embodiments, each server 100, which may include a back-up server for redundancy, may include at least one server processor 104. The server processor 104 may correlate the at least two conditions in the at least one zone to aid in determining whether the one or more polymodal sensors are detecting the biological activity in the zone or in adjacent zones. The server processor 104 may process information relating to at least two conditions originating from a single node 14 or originating from multiple nodes. In correlating the at least two conditions, the server processor 104 may also consider information stored in the local knowledge base 58. In other embodiments, the server processor 104 may analyze only the local knowledge base 58. In still other embodiments, the server processor 104 may analyze the at least two conditions and/or the information in the local knowledge base 58 along with the information in the global knowledge base 106, or combinations thereof. Based upon the activity observed by the data collectors, and based upon data provided by either one of or both the local and global knowledge bases 58 and 106, the system 10 may generate reports or other automated alerts that are sent to an end user. These alerts may be based on preset or predetermined threshold levels, or upon unexpected increases or decreases in expected biologic activity.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

The invention claimed is:

1. A method of detecting biological pests, comprising:
  positioning one or more polymodal sensors that detect data relating to at least two conditions of a targeted biological pest in at least one zone;
  accumulating the data in at least one data collector and gathering information from the at least one data collector in at least one server;
  processing the information in a global learning system that utilizes at least an expert system to correlate the at least two conditions to generate a global knowledge base that is representative of at least one biological activity of the targeted biological pest in the at least one zone, wherein said global learning system employs an artificial intelligence program in cooperation with said expert system to validate detections of said one or more polymodal sensors and to continuously adjust threshold parameters of said expert system to improve accuracy of detection of the targeted biological pest; and
  alerting a user as to the presence of the targeted biological pest based upon the processed information.

2. The method of claim 1, further comprising:
  positioning at least two polymodal sensors in each zone; and
  detecting data by each said polymodal sensor relating to at least two conditions.

3. The method of claim 1, further comprising:
  associating the one or more polymodal sensors with a node processor that transmit the at least two conditions to aid in determining whether the polymodal sensors are detecting the at least one biological activity in the at least one zone.

4. The method of claim 1, further comprising:
  alerting said user as to whether to treat the targeted biological pest based upon said global learning system validation of said data associated with the targeted biological pest.

5. A biological pest detection system, comprising:
  at least one polymodal sensor monitoring at least two conditions of a targeted biological pest;
  at least one node including the at least one polymodal sensor;
  at least one server, each server in communication with one or more of the at least one node, and each server maintaining a global knowledge base of collected sensor data from the at least one node;
  a global learning system associated with said at least one server, said global learning system utilizing at least an expert system to analyze the at least two conditions in detecting the presence of the targeted biological pest; and
  wherein the at least two conditions are utilized in detecting the presence of the targeted biological pest from sensor data contained in the global knowledge base, and wherein said global learning system employs an artificial intelligence program in cooperation with said expert system to validate detections of said at least one polymodal sensor and continuously adjust threshold parameters of said expert system to improve the accuracy of detection of the targeted biological pest, and then generating at least one of a report and an alert.

6. The detection system of claim 5, further comprising:
  a processor contained in each node that processes data relating to the one or more sensors of the node.

7. The detection system of claim 6, further comprising:
  a node communication port contained in each node that communicates with said server.

8. The detection system of claim 7, wherein said node communication port communicates with said server via a wireless or wired signal.

9. The detection system of claim 8, further comprising:
at least one data collector in communication with said at least one node, each data collector collecting and transferring data to said at least one server, wherein said at least one data collector communicates with at least one of a satellite and non-computing system and a terrestrial computing system.

10. The detection system of claim 9 wherein the data collector comprises:
a node-side communication port that communicates with one or more of the at least one node;
a data collector processor that collects information related to the at least two conditions; and
a server-side communication port that communicates with one or more of the at least one server.

11. The detection system of claim 10, further comprising:
a local knowledge base that is maintained within said data collector processor, said local knowledge base including local conditions and said at least two conditions.

12. The detection system of claim 5 wherein the server further comprises:
a server communication port that communicates with one or more of the at least one data collectors; and
a server processor connected to said global learning system that processes information related to the at least two conditions received from the server communication port wherein said server processor and said global learning system employ said artificial intelligence program in cooperation with said expert system to continuously adjust threshold parameters of said expert system.

13. The detection system of claim 5, wherein the global knowledge base is linked to the learning system.

14. The detection system of claim 5, wherein each server stores information related to biological activity in the global knowledge base.

15. A biological pest detection system, comprising:
at least one node, each node including at least two sensors for detecting at least one condition associated with a targeted biological pest and each node generating a node signal related to the at least one condition;
at least one data collector, each data collector receiving at least one node signal from at least one node and storing local information in a local knowledge base and each data collector generating a data collector signal related to at least some of the information in the local knowledge base;
at least one server, each server receiving the data collector signal from at least one data collector and updating a global knowledge base; and
a global learning system associated with said at least one server, said global learning system utilizing at least an expert system, wherein said global learning system analyzes at least two conditions maintained in the global knowledge base to determine the presence of the targeted biological pest, wherein said server and said global learning system employ an artificial intelligence program in cooperation with said expert system to validate detections of said at least two sensors and enable adjustment of threshold parameters to improve detection accuracy of biological pest activity, and wherein said server generates at least one of a report and an alert when thresholds of biological pest activity are met.

* * * * *